(12) United States Patent
Thoen

(10) Patent No.: US 10,050,677 B1
(45) Date of Patent: Aug. 14, 2018

(54) ANTENNA COIL TUNING MECHANISM FOR MAGNETIC COMMUNICATION

(71) Applicant: NXP B.V., Eindhoven (NL)

(72) Inventor: Steven Mark Thoen, Blanden (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/603,054

(22) Filed: May 23, 2017

(51) Int. Cl.
| | |
|---|---|
| *H04B 5/00* | (2006.01) |
| *H04L 27/26* | (2006.01) |
| *H04L 25/02* | (2006.01) |
| *H04B 1/69* | (2011.01) |
| *H04B 1/40* | (2015.01) |
| *H04B 5/02* | (2006.01) |

(52) U.S. Cl.
CPC ............ *H04B 5/0081* (2013.01); *H04B 1/40* (2013.01); *H04B 1/69* (2013.01); *H04L 25/0224* (2013.01); *H04L 27/2613* (2013.01); *H04B 5/02* (2013.01); *H04B 2001/6912* (2013.01)

(58) Field of Classification Search
USPC ................................................. 455/41.1–41.3
See application file for complete search history.

(56) References Cited

U.S. PATENT DOCUMENTS

| | | | |
|---|---|---|---|
| 9,124,302 B2 * | 9/2015 | Krishnan .................. | H04B 5/00 |
| 9,350,405 B2 | 5/2016 | Zhu et al. | |
| 2014/0080409 A1 * | 3/2014 | Frankland ............... | H02J 5/005 |
| | | | 455/41.1 |
| 2014/0256270 A1 * | 9/2014 | Cho ......................... | H04B 5/02 |
| | | | 455/77 |
| 2015/0236520 A1 * | 8/2015 | Baarman ................. | H02J 7/025 |
| | | | 307/104 |
| 2015/0303997 A1 * | 10/2015 | Dhayni .............. | G06K 7/10128 |
| | | | 340/10.1 |
| 2015/0305035 A1 | 10/2015 | Hu et al. | |
| 2016/0134382 A1 * | 5/2016 | Mofidi ............... | G06K 7/10336 |
| | | | 455/41.1 |
| 2016/0182263 A1 * | 6/2016 | Ramakrishnan ........ | H04L 27/04 |
| | | | 375/300 |

OTHER PUBLICATIONS

Chirp—Wikipedia; available on the internet at: https://en.wikipedia.org/wiki/Chirp, 6 pages.
Hunn, "The Market for Smart Wearable Technology a Consumer Centric Approach," WiFore Consulting, Feb. 2015.

(Continued)

*Primary Examiner* — Fayyaz Alam

(57) ABSTRACT

Disclosed is an integrated circuit for a near-field radio, including an inductive-capacitive (LC) tank antenna circuit designed to operate at a predetermined carrier frequency, the tank LC tank antenna circuit including a variable capacitor and an antenna element, a transmitter configured to output a channel sounding signal (CSS) to the LC tank antenna circuit, a receiver to receive the CSS and a tank response from the LC tank antenna circuit, a tank response estimator to extract the tank response of the LC tank antenna circuit by removing the CSS from the received signal and determining an oscillation frequency of the LC tank antenna circuit, and a controller to adjust a reactance of the LC tank antenna circuit to resonate the LC tank antenna circuit and change the oscillation frequency to the predetermined carrier frequency.

20 Claims, 2 Drawing Sheets

(56) References Cited

OTHER PUBLICATIONS

Ozaki et al., "Channel Estimation Technique for OFDM Systems Spread by Chirp Sequences," 2012 IEEE 23rd Intl. Symposium on Personal, Indoor & Mobile Radio Communications pp. 2125-2126.
Yushi Shen, et al., "Channel Estimation in OFDM Systems," Freescale Semiconductor Application Note, AN 3059, Rev. 0, Jan. 2006.

* cited by examiner

ANTENNA COIL TUNING MECHANISM FOR MAGNETIC COMMUNICATION

TECHNICAL FIELD

Embodiments described herein generally relate to an apparatus and method for tuning an antenna coil. Such an apparatus and method may be used for various communication systems including those using a magnetic field to communicate such as near field magnetic induction (NFMI) or Near-Field Communications (NFC). NFMI may be used in truly wireless in-ear headphones, hearing aid instruments, and mission-critical communication.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments include an integrated circuit for a near-field radio, including an inductive-capacitive (LC) tank antenna circuit designed to operate at a predetermined carrier frequency, the tank LC tank antenna circuit including a variable capacitor and an antenna element, a transmitter configured to output a channel sounding signal (CSS) to the LC tank antenna circuit, a receiver to receive the CSS and a tank response from the LC tank antenna circuit, a tank response estimator to extract the tank response of the LC tank antenna circuit by removing the CSS from the received signal and determining an oscillation frequency of the LC tank antenna circuit; and a controller to adjust a reactance of the LC tank antenna circuit to resonate the LC tank antenna circuit and change the oscillation frequency to the predetermined carrier frequency.

CSS parameters may be stored in a look-up table of a memory element to enable generation of the CSS.

The CSS may have a bandwidth around the predetermined carrier frequency.

The CSS may be an orthogonal frequency division multiplexing (OFDM) signal. The CSS may be a chirp sequence. The CSS may be a combined orthogonal frequency division multiplexing (OFDM) signal and chirp sequence.

The tank response estimator may determine a relative oscillation frequency offset of an antenna coil.

The reactance of the LC antenna circuit may be a variable capacitor. The reactance of the LC antenna circuit may be an inductance of the antenna.

Various embodiments may include a method of tuning an antenna coil having a predetermined carrier frequency, including sending a single channel sounding signal (CSS) through an inductive-capacitive (LC) tank antenna circuit having inductive and capacitive components to estimate a tank response, receiving a received signal including the CSS and a tank response from the LC tank antenna circuit, extracting the tank response of the LC tank antenna circuit by removing the CSS from the received signal, using the tank response to determine an oscillation frequency of the LC tank antenna circuit, and adjusting a reactance of the LC tank antenna circuit to resonate the LC tank antenna circuit at the predetermined carrier frequency.

The method may include reading the CSS signal from a memory element before sending it through the LC tank antenna circuit.

CSS parameters may be stored in a look-up table of the memory element to enable generation of the CSS.

The CSS may have a bandwidth around the predetermined carrier frequency.

The method may include adjusting a resistor of the LC tank antenna circuit to tune a bandwidth of the LC tank antenna circuit.

The method may include determining a relative oscillation frequency offset of an antenna coil.

The CSS of the method may be an orthogonal frequency division multiplexing (OFDM) signal. The CSS of the method is a chirp sequence. The CSS of the method may be a combined orthogonal frequency division multiplexing (OFDM) signal and chirp sequence.

Adjusting the reactance may include adjusting a capacitance of the variable capacitor. Adjusting the reactance may include adjusting an inductance of the antenna.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
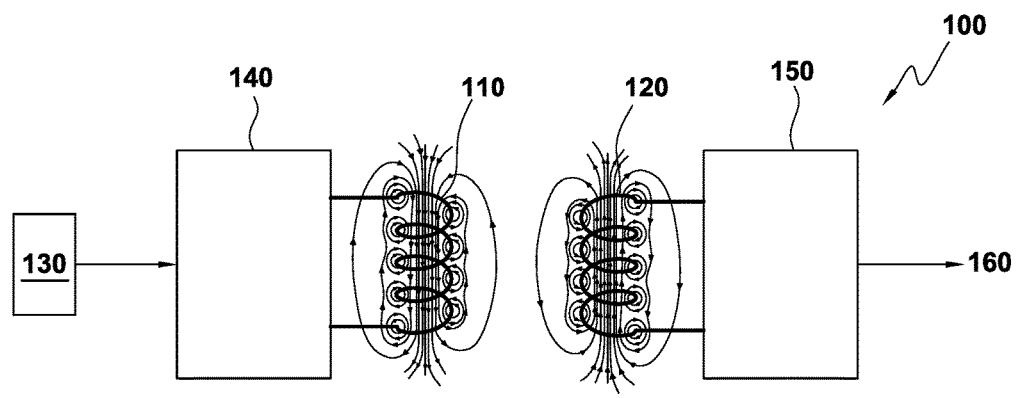
FIG. 1 illustrates magnetic coupling of antenna coils in a near field arrangement in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

Near Field Magnetic Induction (NFMI) technology is an emerging technology being used in lieu of, or sometimes in combination with Bluetooth radio frequency (RF). NFMI is more power-efficient than RF for short distances. The steep degradation of NFMI signal strength as a function of distance increases privacy and reduces issues with interference compared to RF. Less issues with interference means increased robustness. NFMI propagates through the human body with very low absorption, whereas RF does not.

During sports and fitness activities, for example, the wires of today's in-ear headphones (known as earphones, earbuds, etc.) are a genuine inconvenience and can potentially be unsafe. Truly wireless in-ear headphones include wireless audio streaming from ear-to-ear to provide substantially increased user comfort for sport activities, and in general in all situations where wires are undesired, unwanted, and annoying to users.

Existing earbuds have a wired connection from ear to ear. This is largely due to the fact that sending a stereo audio stream towards two distinct earbuds is challenging with today's 2.4 GHz technology. A standard Bluetooth A2DP profile, which supports only point-to-point connections, does not support this use case. Forwarding a high quality audio stream from one ear to the other using reasonable power levels is notoriously difficult using 2.4 GHz technology because most of the signal is absorbed by the human body tissue.

The wireless technology being used to enable truly wireless earbuds is based on Near Field Magnetic Induction (NFMI). NFMI features properties such as ultra-low power consumption and the ability to create a very reliable network in and around the human body, with both high-quality audio and data streaming supported over small distances (<1 m). An additional integration advantage is also that it requires few external components. NFMI is a short range technology and as such also creates a private network, making it much less susceptible to interference than 2.4 GHz transceivers.

FIG. 1 illustrates magnetic coupling of antenna coils in a near field arrangement 100 in accordance with embodiments described herein. A tuner circuit may include an inductor and capacitor connected in parallel, where the capacitor or inductor is made to be variable. This configuration may create a resonant tank circuit which responds to an alternating current at one frequency, the carrier frequency. After manufacture, values of the components of the tank circuit, for example the inductive antenna, may have shifted. One purpose of embodiments described herein is to determine the frequency of the tank circuit and adjust a setting of the variable capacitor to create resonance with the antenna at the predetermined carrier frequency of the transmitter and receiver. A variable resistor may also be adjusted to determine a desired bandwidth. Another approach is to not adjust a tank response but to change the carrier frequency of a transmission to line up with an oscillation frequency of the tank circuit. In such a way, a variable capacitor may not be used.

Magnetic communication such as NFMI radio or near field communication (NFC) make use of a transmitter antenna coil 110 and receiver antenna coil 120, which are magnetically coupled to each other and thus enable communication. Data or audio received from an external source 130 is input to a transmitter circuit 140 that includes transmission processing components and a coil driver. Voice or data may be modulated onto a carrier frequency and transmitted through the transmitter antenna coil 110. At the receive side for NFC, the receiver antenna coil 120 when placed proximate to the transmitter antenna coil 110, will energize and receive the modulated carrier signal. Receiver circuit 150 may include a low noise amplifier to amplify the level of the received signal as well as other receive processing components to demodulate the received signal and output data 160 for further use.

Figure 2:
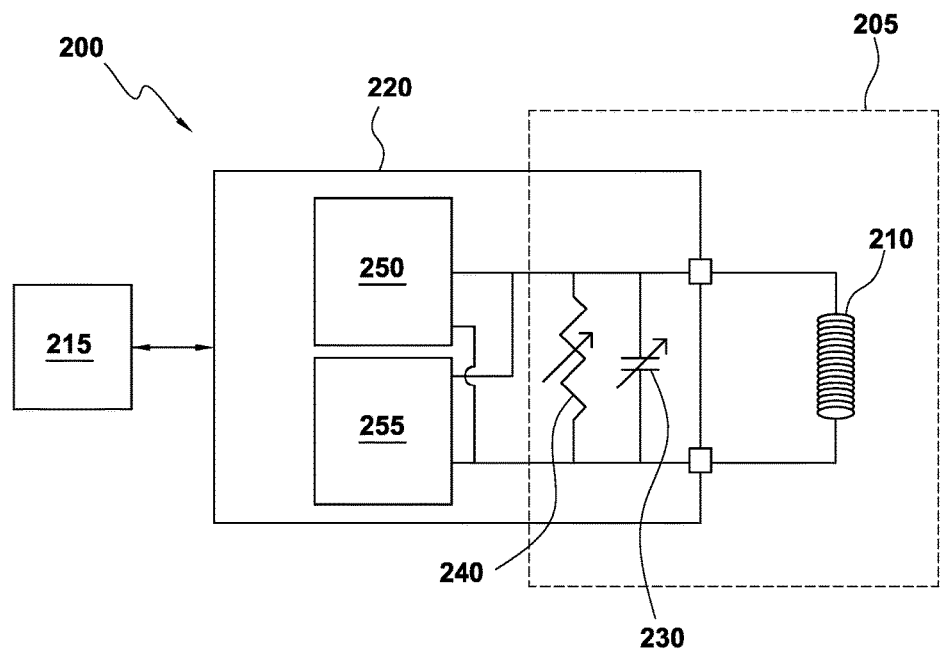
FIG. 2 illustrates a radio transceiver in accordance with embodiments described herein.

FIG. 2 illustrates a radio transceiver 200 in accordance with embodiments described herein. The NFMI radio transceiver 200 may include an LC tank circuit 205. In order to increase a communication range, resonant coils are used such as antenna coil 210 having an inductance L, where the correct amount of capacitance C is added to the coil (either in parallel or series) using programmable capacitor bank 230 to ensure resonance at a carrier frequency. Additionally, a quality factor (Q) of the resulting LC tank circuit 205 is controlled to achieve the right amount of bandwidth for the communication. If the bandwidth of the LC tank circuit 205 is too narrow, the transmitted signal will be distorted, leading to inter-symbol interference (ISI). If the bandwidth of the LC tank circuit 205 is too wide, then the quality factor Q is too low and the achievable range will drop accordingly due to for example increased noise and interference.

The antenna coil 210 may be external or internal to a radio transceiver IC 220 and both its inductance L and Q can vary due to production tolerances and due to nearby metallic objects. The NFMI radio transceiver 200 may be controlled by a controller 215 that is internal or external to the radio transceiver IC 220. In designs that use NFMI radios in accordance with embodiments described herein, there may be a parallel, programmable capacitor bank 230 to tune the resonance frequency of the antenna coil 210 such that the resonance frequency aligns with the carrier frequency (10 MHz for NFMI and 13.56 MHz for NFC). Additionally, a programmable resistor bank 240 is included which can be used to control the Q of LC tank antenna circuit 205.

In order to determine a correct amount of capacitance and resistance to add to the LC tank antenna circuit 205, a coil measurement and tuning algorithm is used. In an existing coil tuning algorithm, three consecutive tones are generated by the controller 215 and output from the transmitter 250.

A tone having a carrier frequency may be represented by f0. This tone is generated by a sending an unmodulated carrier to a transmitter 250. A lower frequency f1=f0−fs/2 is further generated, with fs equal to the baseband symbol rate. This tone may be generated by FSK-modulating a series of 0 bits. A higher frequency of f2=f0+fs/2 is further generated, with fs equal to the baseband symbol rate. This tone may be generated by FSK-modulating a series of 1 bits.

While each tone is applied consecutively to the LC tank antenna circuit 205 by the transmitter 250, a receiver 255 makes a measurement of received signal strength (RSSI). This RSSI measurement is a direct measurement of the frequency response of the LC tank antenna circuit 205 at the tone which is being applied.

Alternatively, instead of matching a resonant frequency of the tank circuit 205 to a carrier frequency, embodiments described herein may change a carrier frequency of a transmission line to line up with an oscillation frequency of the tank circuit 205. In this configuration, adjustment of the variable capacitor 230 is not needed to adjust the frequency of the tank circuit 205.

Figure 3:
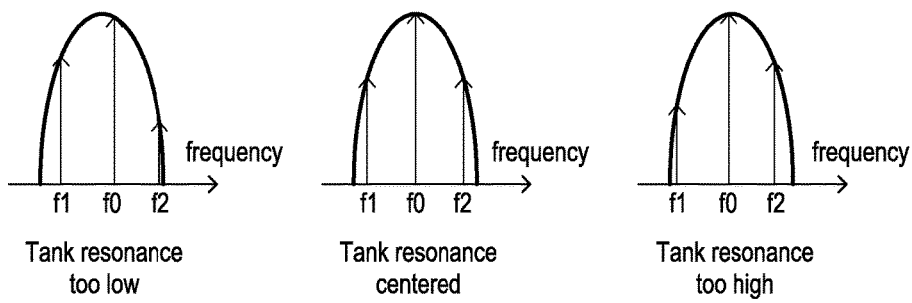
FIG. 3 illustrates LC tank antenna circuit resonance frequency measurement in accordance with embodiments described herein.

FIG. 3 illustrates the LC tank antenna circuit resonance frequency measurement 300 in accordance the existing tuning algorithm where three consecutive tones are applied. By comparing the frequency response measurements of the three tones f0, f1, and f2, as illustrated in FIG. 3 the offset of the carrier frequency with respect to the LC tank antenna circuit 205 resonance frequency of FIG. 2 can be estimated. From this offset estimate, a correction to a programmable capacitor bank 230 of FIG. 2 can be derived and applied.

The three tones f0, f1, and f2 are applied sequentially for a certain period of time which includes the time for the LC tank antenna circuit 205 to stabilize to the equilibrium response for each frequency and the time to make an accurate RSSI measurement. LC tank antenna circuit 205 response is measured in terms of voltage, the amplitudes received on the LC tank antenna circuit 205. When well tuned as illustrated by the graph in the middle, the carrier frequency f0 should be in the middle, and the lower frequency f1 and higher frequency f2 should be offset, and their measured RSSI should be lower than the RSSI at f0. When the measured RSSI at f1 and f2 are equal, the quality factor Q can be determined by the difference between the RSSI at f0 and f2 or the difference between the RSSI at f0 and f1, which can be used to determined the bandwidth of the LC tank antenna circuit 205. From the three measurements, it can be determined if the LC-tank antenna circuit 205 is offset to the left or to the right, either too high frequency or too low.

In total, the existing tuning algorithm where three consecutive tones are applied, means that tuning the LC-tank antenna circuit 205 takes a significant amount of time and may reduce the effective data rate for the system (because during tuning communication is not possible) and requires additional current as the LC-tank antenna circuit 205 may be driven during the whole period.

The frequency span of the 3 tones is limited to fs, the baseband symbol rate. If the LC-tank antenna circuit 205 resonance frequency is outside this frequency span, the algorithm has a hard time distinguishing whether the resonance frequency is higher or lower than the carrier frequency. Then the resonance frequency may be searched for, further increasing the time to tune the receiver.

Figure 4:
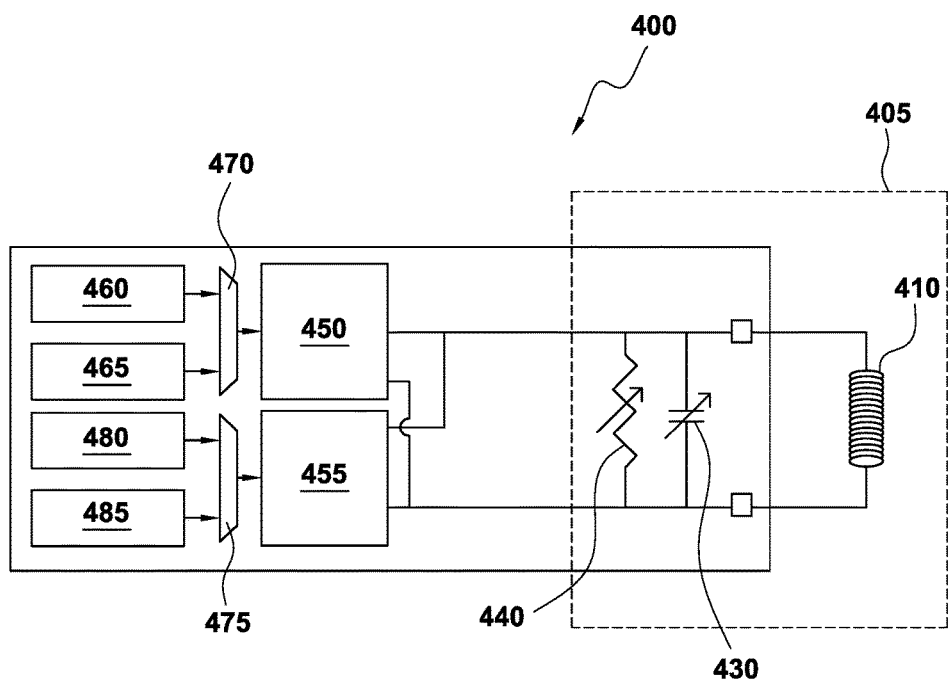
FIG. 4 illustrates a radio transceiver in accordance with embodiments described herein.

FIG. 4 illustrates a radio transceiver 400 in accordance with embodiments described herein. The radio transceiver 400 may include an LC tank circuit 405 having an antenna coil 410, a programmable capacitor bank 430, and a programmable resistor bank 440. The radio transceiver 400 may also include transmitter circuitry 450, and receiver circuitry 455. The transmitter circuitry 450 and receiver circuitry 455 may be elements on a large chip 420 that includes many other components (not illustrated).

The radio transceiver 400 may include a channel sounding sequence (CSS) memory element 460 to store and playback a CSS to be used for circuit resonance determination. The CSS may be a pre-amble or non-sequence of signals combined with a data signal and used to estimate a desired channel between the transmitter circuitry 450 and receiver circuitry 455. The radio transceiver 400 may include a data generation circuit 465 to generate audio and other data to be transmitted via a transmitter. A CSS output by the CSS memory 460 and a data signal generated by the data generation circuit 465 may be multiplexed by a multiplexer 470 and sequentially output to the transmitter circuitry 450. The CSS transmission signal will be stored in the CSS memory 460 and output therefrom. The CSS signal can be generated offline and loaded into the CSS memory 460 and used when desired.

In accordance with embodiments described herein, rather than sending three consecutive sine waves to estimate the channel response at three distinct frequencies, a method of tuning the antenna coil 410 may use the CSS memory 460 to generate and send a single CSS that may be used to estimate a complete tank response of the LC tank circuit 405 over a whole frequency band of interest. This single CSS, which may be configured to have a bandwidth near the carrier frequency fc, uses the transmitter circuitry 450. The transmitter circuitry 450 may upconvert the CSS to a desired frequency and to apply it to the LC tank circuit 405. Transmitted through the LC tank circuit 405, the CSS may be acted upon by the LC tank circuit 405, picking up the response thereof and tank noise. On a receive side, the receiver circuitry 455 may be used to receive the resulting signal and to convert it back to baseband. The baseband signal is output to a demultiplexer 475 that demultiplexes the baseband signal into the a modified CSS signal. The modified CSS signal may be output to a tank response estimator 480. Data received from another device may be output to a data receiver 485.

Based on the received baseband signal from the receiver circuitry 455, which is the convolution of a known CSS sequence with the tank response with tank noise added, the tank response estimator 485 can extract the response of the LC tank 405 by removing the known CSS signal from the received signal. From this, the oscillating frequency of the tank circuit can be determined, and the value of the programmable capacitor bank 430 can be adjusted to alter the oscillating frequency to be the same as the predetermined carrier frequency. Also, a value of the inductive antenna 410 may be adjusted to alter the oscillating frequency to be the same as the predetermined carrier frequency. In other words, a reactance of the LC tank antenna circuit 405 may be adjusted, be it either adjusting a variable capacitor 430 or the inductive antenna 410. Any known transmit sequence is in theory possible but preferably, the CSS sequence is chosen such that the tank response estimator 485 can easily remove the CSS signal from the received signal to extract the LC tank response. The tank response estimator 485 may be embodied in a digital signal processor (DSP).

Various approaches for such a channel sounding signal (CSS) can be considered. One option is to use an orthogonal frequency division multiplexing (OFDM) signal with known reference signals. Using OFDM, a signal is input and portions of the signal or multiple signals are put on different frequency carriers and separated in the frequency domain. To obtain a high spectral efficiency, the frequency responses of the frequency carriers are overlapping and orthogonal. To generate that signal based upon the carrier an inverse FFT is taken, which modulates the signal. Because the transmitter circuitry 450 sends and receives a single known sequence (CSS), the OFDM signal generation and demodulation can be simplified substantially, such that no general OFDM modem is required. Additionally, the OFDM-based CSS sequence can be optimized to different goals (peak-to-average, CSS generator complexity, tank response estimator complexity) by optimizing the reference signals on various subcarriers without any impact on the tank response estimation accuracy.

Another version of a CSS may be a chirp sequence that implements a frequency sweep, and the response is given as a function of time. Alternatively, a combination of an OFDM and chirp sequence may be used as the CSS, and other channel sounding signals may be used as well.

By selective design of the channel sounding signal CSS, the tank response estimator 485 can be made in different ways. In the time domain, the received signal is the convolution of the transmitted CSS signal with the tank response with noise added. Subtracting out the CSS and noise to arrive at the tank response is challenging. In the frequency domain, the receiver circuitry 455 receives the tank response multiplied by the CSS frequency, plus noise. When tank response estimation is performed in the frequency domain, a Least-Squares (LS) estimation of the tank response can be obtained by division by the CSS frequency. Alternatively, a Minimum Mean Square Error (MMSE) estimation filter can be applied to estimate the tank response.

To achieve these results, the tank response estimator 485 may be a digital component such as an estimator having low complexity and high accuracy. For example, a one-dimensional (1D) tank response estimator 485 may be used to receive the OFDM signal. Two types of tank response estimators 485 include block-type and comb-type in which reference signals are inserted in the frequency direction and in the time direction, respectively. The estimations for the block-type pilot arrangement may be based on least square (LS), minimum mean-square error (MMSE), and modified MMSE. The estimations for the comb-type arrangement includes the LS estimator with 1D interpolation, the maximum likelihood (ML) estimator, and the parametric channel modeling-based (PCMB) estimator.

Embodiments described herein have many characteristics. The proposed scheme has a very wide locking range. The bandwidth of the CSS can be made as wide as needed to cover the full range of possible oscillation frequencies of the un-tuned LC tank (as defined by the shift and tolerance of the antenna inductance). The bandwidth of the CSS can be different from the bandwidth of the actual data transmission scheme, which gives additional design flexibility.

The proposed scheme has high accuracy. Using a CSS, a whole channel response may be measured in one step rather than at three discrete frequencies. Very accurate estimation of the actual oscillation frequency of the LC tank is permitted. A length of the CSS can be tuned for more or less noise averaging, depending on the required signal to noise (SNR) ratio for the tank response estimator, the noise level of the tank and the drive level of the transmitter circuitry 450.

According to embodiments described herein, fast tank measurement and tuning are possible. The existing approach requires three consecutive measurements where the tank needs to stabilize three times. As described herein, the tank stabilizes once. This structure and method lead to reduced power consumption and less impact on system throughput. By measuring the whole channel response in one step in combination with selecting the right bandwidth for the CSS, the oscillation frequency of the LC tank may be identified immediately from the tank response estimation and no iterations are required.

The CSS generator 460 and tank response estimator 480 have small area and power impact. These circuits may be purely digital circuits and may be optimized heavily. As a result, they require very little additional area overhead. Both The CSS generator 460 and tank response estimator 480 can be switched off completely during normal data communication. Hence, the power overhead is negligible.

One of the aspects of embodiments described herein is a digital approach in that the CSS memory 460 includes a pre-defined look-up transmission signal. Once the signal is received back via the receiver circuitry 455, the convoluted received signal can be input into the digital domain to be processed in an efficient manner. The calibration of the radio transceiver 400 may be performed during the initial tuning of a device it is installed within.

Using a CSS permits the testing circuit to perform an action separately than an actual data transmission of a radio circuit. This allows the testing or tuning circuit to use a much wider bandwidth than the actual transmission scheme.

Components of the radio transceiver circuit 400 may have high accuracy because they are purely digital. After a CSS signal is removed during the receive operation, the oscillation frequency of the circuit may be extracted. Performing calibration using the OFDM approach, a whole frequency response is obtained, on the order of 512 points depending on the length of the Fast Fourier Transform (FFT) that is used. The whole response may be seen and using the tank response estimator 485, the oscillation frequency may be extracted as well as the bandwidth. High accuracy may also be obtained as there is a tradeoff between the length of the CSS to result in better SNR based on the noise level and the drive level of the circuit 400.

When the CSS signal is removed in the frequency domain, the tank frequency response of the tank circuit remains. Knowing a measure of the coil 410, the actual oscillation frequency of the tank circuit 405 remains and the parameters of the variable capacitor 430 or the antenna coil 410 may be changed to match the carrier frequency. The parameter of the variable resistor 440 may also be changed to obtain a specified bandwidth.

Embodiments described herein may be used in NFMI radios in the Hearables space and to other magnetic systems relying on resonating coils for either communication or power transfer. Examples include all NFC systems as well as power transfer standards such as A4WP.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. An integrated circuit for a near-field radio, comprising:
    an inductive-capacitive (LC) tank antenna circuit designed to operate at a predetermined carrier frequency, the tank LC tank antenna circuit including a variable capacitor and an antenna element;
    a transmitter configured to output a channel sounding signal (CSS) to the LC tank antenna circuit;
    a receiver to receive the CSS and a tank response from the LC tank antenna circuit;
    a tank response estimator to extract the tank response of the LC tank antenna circuit by removing the CSS from the received signal and determining an oscillation frequency of the LC tank antenna circuit; and a controller to adjust a reactance of the LC tank antenna circuit to resonate the LC tank antenna circuit and change the oscillation frequency to the predetermined carrier frequency.

2. The integrated circuit of claim 1, wherein CSS parameters are stored in a look-up table of a memory element to enable generation of the CSS.

3. The integrated circuit of claim 1, wherein the CSS has a bandwidth around the predetermined carrier frequency.

4. The integrated circuit of claim 1, wherein the CSS is an orthogonal frequency division multiplexing (OFDM) signal.

5. The integrated circuit of claim 1, wherein the CSS is a chirp sequence.

6. The integrated circuit of claim 1, wherein the CSS is a combined orthogonal frequency division multiplexing (OFDM) signal and chirp sequence.

7. The integrated circuit of claim 1, wherein the tank response estimator determines a relative oscillation frequency offset of an antenna coil.

8. The integrated circuit of claim 1, wherein the reactance of the LC antenna circuit is a variable capacitor.

9. The integrated circuit of claim 1, wherein the reactance of the LC antenna circuit is an inductance of the antenna.

10. A method of tuning an antenna coil having a predetermined carrier frequency, comprising:
sending a single channel sounding signal (CSS) through an inductive-capacitive (LC) tank antenna circuit having inductive and capacitive components to estimate a tank response;
receiving a received signal including the CSS and a tank response from the LC tank antenna circuit;
extracting the tank response of the LC tank antenna circuit by removing the CSS from the received signal;
using the tank response to determine an oscillation frequency of the LC tank antenna circuit;
and
adjusting a reactance of the LC tank antenna circuit to resonate the LC tank antenna circuit and change the oscillation frequency to at the predetermined carrier frequency.

11. The method of claim 10, comprising reading the CSS signal from a memory element before sending it through the LC tank antenna circuit.

12. The method of claim 11, wherein CSS parameters are stored in a look-up table of the memory element to enable generation of the CSS.

13. The method of claim 10, wherein the CSS has a bandwidth around the predetermined carrier frequency.

14. The method of claim 10, comprising adjusting a resistor of the LC tank antenna circuit to tune a bandwidth of the LC tank antenna circuit.

15. The method of claim 10, comprising determining a relative oscillation frequency offset of an antenna coil.

16. The method of claim 10, wherein the CSS is an orthogonal frequency division multiplexing (OFDM) signal.

17. The method of claim 10, wherein the CSS is a chirp sequence.

18. The method of claim 10, wherein the CSS is a combined orthogonal frequency division multiplexing (OFDM) signal and chirp sequence.

19. The method of claim 10, wherein adjusting the reactance includes adjusting a capacitance of the variable capacitor.

20. The method of claim 10, wherein adjusting the reactance includes adjusting an inductance of the antenna.

* * * * *